(12) United States Patent
Sultenfuss et al.

(10) Patent No.: US 9,268,434 B2
(45) Date of Patent: Feb. 23, 2016

(54) SYSTEMS AND METHODS FOR REDUCING POWER CONSUMPTION IN A TOUCH SENSOR DISPLAY

(71) Applicant: Dell Products L.P., Round Rock, TX (US)

(72) Inventors: Andrew Thomas Sultenfuss, Leander, TX (US); Stefan Peana, Austin, TX (US)

(73) Assignee: Dell Products L.P., Round Rock, TX (US)

(*) Notice: Subject to any disclaimer, the term of this patent is extended or adjusted under 35 U.S.C. 154(b) by 171 days.

(21) Appl. No.: 13/767,463

(22) Filed: Feb. 14, 2013

(65) Prior Publication Data

US 2014/0225841 A1    Aug. 14, 2014

(51) Int. Cl.
*G06F 3/041* (2006.01)
*G06F 1/32* (2006.01)

(52) U.S. Cl.
CPC ............ *G06F 3/0416* (2013.01); *G06F 1/3206* (2013.01); *G06F 1/3231* (2013.01); *G06F 1/3262* (2013.01); *Y02B 60/1289* (2013.01)

(58) Field of Classification Search
CPC ..... G06F 3/041; G06F 3/0412; G06F 3/0416; G06F 1/32; G06F 1/3203; G06F 1/3206; G06F 1/3262; Y02B 60/1289
USPC ................................................. 345/173–174
See application file for complete search history.

(56) References Cited

U.S. PATENT DOCUMENTS

| | | | | |
|---|---|---|---|---|
| 5,977,957 | A * | 11/1999 | Miller et al. | 345/174 |
| 9,092,220 | B2 * | 7/2015 | Wyatt | G06F 1/3206 |
| 2004/0210786 | A1 * | 10/2004 | Lyons | G06F 1/32 |
| | | | | 713/320 |
| 2006/0284857 | A1 * | 12/2006 | Oh | 345/173 |
| 2008/0055318 | A1 * | 3/2008 | Glen | G09G 3/20 |
| | | | | 345/501 |
| 2008/0062140 | A1 * | 3/2008 | Hotelling | G09G 3/3648 |
| | | | | 345/173 |
| 2008/0272836 | A1 * | 11/2008 | Smit et al. | 327/544 |
| 2008/0316197 | A1 * | 12/2008 | Ds | G06F 1/3203 |
| | | | | 345/212 |
| 2010/0321321 | A1 * | 12/2010 | Shenfield et al. | 345/173 |
| 2011/0043483 | A1 * | 2/2011 | Mizuhashi et al. | 345/174 |
| 2011/0050618 | A1 * | 3/2011 | Murphy | G06F 1/3215 |
| | | | | 345/174 |
| 2011/0050638 | A1 * | 3/2011 | Lee | 345/174 |
| 2011/0080367 | A1 * | 4/2011 | Marchand et al. | 345/174 |
| 2011/0285644 | A1 * | 11/2011 | Chang et al. | 345/173 |
| 2012/0044199 | A1 * | 2/2012 | Karpin et al. | 345/174 |
| 2012/0062470 | A1 * | 3/2012 | Chang | 345/173 |
| 2012/0105357 | A1 * | 5/2012 | Li et al. | 345/174 |

(Continued)

*Primary Examiner* — Larry Sternbane
*Assistant Examiner* — Darlene M Ritchie
(74) *Attorney, Agent, or Firm* — Jackson Walker L.L.P.

(57) ABSTRACT

In accordance with embodiments of the present disclosure, a method may include receiving information communicated from a touch sensor controller configured to translate signals received from the touch sensor and control a rate of sampling of tactile touches on the touch sensor. The method may also include receiving information communicated from a proximity sensor configured to detect a human finger or stylus proximate to the touch sensor. The method may further include, based on the information communicated from the touch sensor controller and information communicated from the proximity sensor, determining a desired rate of sampling. The method may additionally include causing the touch sensor controller to control the rate of sampling such that the touch sensor operates at the desired rate of sampling.

21 Claims, 1 Drawing Sheet

(56) References Cited

U.S. PATENT DOCUMENTS

| | | | |
|---|---|---|---|
| 2013/0021303 A1* | 1/2013 | Martin | G06F 1/3262 345/178 |
| 2013/0054998 A1* | 2/2013 | Wyatt | G06F 1/3265 713/323 |
| 2013/0222302 A1* | 8/2013 | Savard | G06F 3/0416 345/173 |
| 2013/0290758 A1* | 10/2013 | Quick | G06F 1/3203 713/323 |
| 2013/0293244 A1* | 11/2013 | Leek | 324/630 |
| 2014/0071062 A1* | 3/2014 | Fang | G06F 3/0416 345/173 |
| 2014/0111474 A1* | 4/2014 | Bytheway | G06F 3/044 345/174 |
| 2014/0125620 A1* | 5/2014 | Panther | G06F 3/011 345/173 |
| 2014/0136867 A1* | 5/2014 | Yamamoto | G06F 1/3262 713/320 |
| 2014/0176451 A1* | 6/2014 | Chang | 345/173 |
| 2014/0204044 A1* | 7/2014 | Mak-Fan et al. | 345/173 |

* cited by examiner

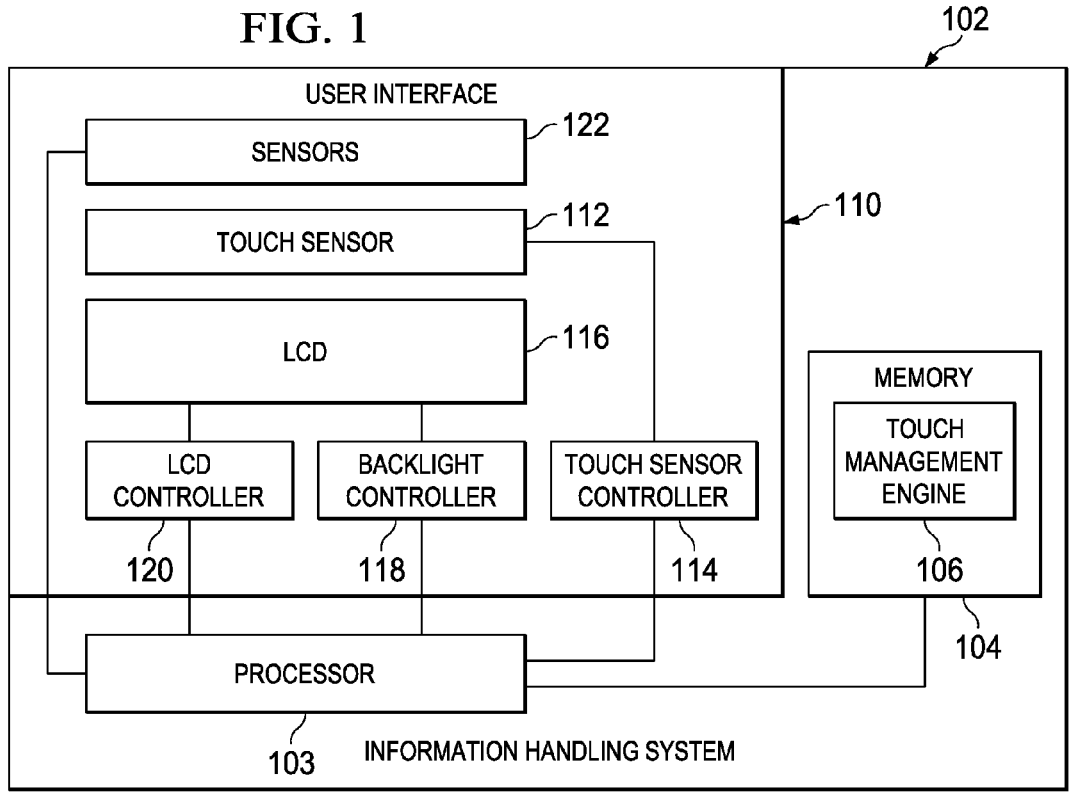
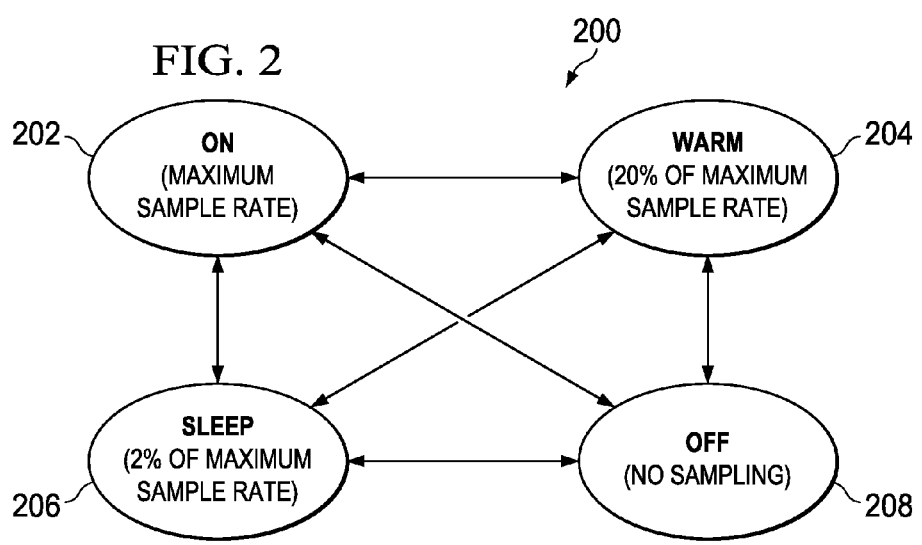

US 9,268,434 B2

SYSTEMS AND METHODS FOR REDUCING POWER CONSUMPTION IN A TOUCH SENSOR DISPLAY

TECHNICAL FIELD

The present disclosure relates in general to information handling systems, and more particularly to reducing power consumption in a touch sensor display.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In accordance with the teachings of the present disclosure, the disadvantages and problems associated with power consumption of touch sensors in touch sensor displays have been reduced or eliminated.

In accordance with embodiments of the present disclosure, an information handling system may include a processor, a user interface, and a proximity sensor. The user interface may include a display, a touch sensor overlaid on the display and configured to detect tactile touches on the user interface, and a touch sensor controller communicatively interfaced between the touch sensor and the processor. The touch sensor may be configured to translate signals received from the touch sensor and communicate such translated signals to the processor and control a rate of sampling of tactile touches on the touch sensor. The proximity sensor may be communicatively coupled to the processor and configured to detect a human finger or stylus proximate to the touch sensor. The processor may be configured to, based on information communicated to the processor from the touch sensor and information communicated to the processor from the proximity sensor, determine a desired rate of sampling and cause the touch sensor controller to control the rate of sampling such that the touch sensor operates at the desired rate of sampling.

In accordance with these and other embodiments of the present disclosure, a method may include receiving information communicated from a touch sensor controller configured to translate signals received from the touch sensor and control a rate of sampling of tactile touches on the touch sensor. The method may also include receiving information communicated from a proximity sensor configured to detect a human finger or stylus proximate to the touch sensor. The method may further include, based on the information communicated from the touch sensor controller and information communicated from the proximity sensor, determining a desired rate of sampling. The method may additionally include causing the touch sensor controller to control the rate of sampling such that the touch sensor operates at the desired rate of sampling.

In accordance with these and other embodiments of the present disclosure, an article of manufacture may include a computer readable medium and computer-executable instructions carried on the computer readable medium, the instructions readable by a processor. The instructions, when read and executed, may cause the processor to: (i) receive information communicated from a touch sensor controller configured to translate signals received from the touch sensor and control a rate of sampling of tactile touches on the touch sensor; (ii) receive information communicated from a proximity sensor configured to detect a human finger or stylus proximate to the touch sensor; (iii) based on the information communicated from the touch sensor controller and information communicated from the proximity sensor, determine a desired rate of sampling; and (iv) cause the touch sensor controller to control the rate of sampling such that the touch sensor operates at the desired rate of sampling.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 illustrates a block diagram of an example information handling system, in accordance with certain embodiments of the present disclosure; and FIG. 2 illustrates a state diagram chart depicting an example method for implementing a multi-mode, multi-sensor approach for managing a touch sensor, in accordance with certain embodiments of the present disclosure.

DETAILED DESCRIPTION

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, busses, memories, I/O devices and/or interfaces, storage resources, network interfaces, motherboards, and/or any other components and/or elements of an information handling system.

FIG. 1 illustrates a block diagram of an example information handling system 102. In some embodiments, information handling system 102 may be a mobile device sized and shaped to be readily transported and carried on a person of a user of information handling system 102 (e.g., a smart phone, a tablet computing device, a handheld computing device, a personal digital assistant, a notebook computer, etc.). As depicted in FIG. 1, information handling system 102 may include a processor 103, a memory 104 communicatively coupled to processor 103, and a user interface 110 coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off. As shown in FIG. 1, memory 104 may have stored thereon a touch management engine 106.

Touch management engine 106 may include any system, device, or apparatus configured to analyze data received from user interface 110 and based on such analysis, select a power state from a plurality of power states for a touch sensor 112 of user interface 110 to operate, as is described in greater detail elsewhere in this disclosure. In some embodiments, touch management engine 106 may be implemented as a program of instructions that may be read by and executed on processor 103 to carry out the functionality of one-time biometric touch management engine 106. In some embodiments, touch management engine 106 may be configured to perform all or a part of method 200, described below.

User interface 110 may comprise any instrumentality or aggregation of instrumentalities by which a user may interact with information handling system 102. For example, user interface 110 may permit a user to input data and/or instructions into information handling system 102, and/or otherwise manipulate information handling system 102 and its associated components. User interface 110 may also permit information handling system 102 to communicate data to a user, e.g., by way of a display device. In some embodiments, user interface 110 may comprise a touch-screen display. When implemented as a touch-screen display, user interface 110 may comprise touch sensor 112, touch sensor controller 114, liquid crystal display (LCD) 116, backlight controller 118, LCD controller 120, and one or more other sensors 122.

As known in the art, a touch sensor 112 may include any system, device, or apparatus configured to detect tactile touches (e.g., by a human finger, a stylus, etc.) on touch sensor 112 and generate one or more signals indicative of the occurrence of such touches and/or the locations of such touches on the touch sensor 112. In some embodiments, touch sensor 112 may be a capacitive touch sensor configured to detect changes in capacitance induced by tactile touches. In these and other embodiments, touch sensor 112 may be constructed from substantially optically transparent material and placed over LCD 116 or another display apparatus, allowing a user to view graphical elements of the touch display while interacting with touch sensor 112.

Touch sensor controller 114 may be communicatively coupled between touch sensor 112 and processor 103, and comprise any system, device, or apparatus configured to process signals indicative of touches received from touch sensor 112 and translate such signals into signals which may be processed by processor 103. In addition, touch sensor controller 114 may control one or more operating conditions associated with touch sensor 112, including the rate of sampling touches, whether touch sensor 112 is powered on or enabled, and/or other operating conditions.

LCD 116 may comprise any suitable system, device, or apparatus configured to display human-perceptible graphical data and/or alphanumeric data to user interface 110. As is known in the art, LCD 116 may include an array of liquid crystals configured to modulate light generated by a backlight in order to create graphical data and/or alphanumeric data on LCD 116. Although FIG. 1 specifically depicts LCD 116, in some embodiments user interface 110 may include a display device other than an LCD.

Backlight controller 118 may be communicatively coupled between LCD 116 and processor 103, and comprise any system, device, or apparatus configured to control operating of a backlight present in LCD 116, including controlling an intensity of light generated by such backlight.

LCD controller 120 may be communicatively coupled between LCD 116 and processor 103, and comprise any system, device, or apparatus configured to, based on graphical data communicated from processor 103 to LCD controller 120, control individual liquid crystals of LCD 116 in order to modulate the light generated by a backlight, thus creating a display of graphical data and/or alphanumeric data on LCD 116.

Sensors 122 may comprise one or more sensors other than touch sensor 112 communicatively coupled to processor 103 and configured to detect the likelihood of an imminent touch upon touch sensor 112. For example, sensors 122 may include a near-field sensor configured to detect the presence of electromagnetic radiation proximate to, but not necessarily in contact with, touch sensor 112. Such detected electromagnetic radiation could be indicative of the presence of a human finger or stylus near touch sensor 112 even if no touch contact has been made to touch sensor 112 by such human finger or stylus. As another example, sensors 122 may include an antenna configured to detect a change in electromagnetic radiation proximate to, but not necessarily in contact with, touch sensor 112. Again, such change in electromagnetic radiation could be indicative of the presence of a human finger or stylus near touch sensor 112 even if no touch contact has been made to touch sensor 112 by such human finger or stylus. As a further example, sensors 122 may include any suitable sensor that is capable of detecting presence of a human finger or stylus within a particular proximity to touch sensor 112. Although FIG. 1 depicts sensors 122 as integral to user interface 110, in some embodiments of information handling system 102, one or more of sensors 122 may be external to user interface 110.

In addition to processor 103, memory 104, and user interface 110, information handling system 102 may include one or more other information handling resources. An information handling resource may include any component system, device or apparatus of an information handling system, including without limitation, a processor (e.g., processor 103), bus, memory (e.g., memory 104), I/O device and/or interface, storage resource (e.g., hard disk drives), network interface, electro-mechanical device (e.g., fan), display, power supply, and/or any portion thereof.

In operation, touch management engine 106 may receive information from touch sensor controller 114 (e.g., indicative of touches on touch sensor 112), one or more sensors 122 (e.g., indicative of the presence of a human finger or stylus proximate to touch sensor 112), and LCD controller 120 (e.g., indicative of whether LCD 116 is in a power self-refresh mode or similar power-conserving mode) and analyze such information to determine a power mode for touch sensor 112. Each such power mode may define a rate of sampling for capturing touches by touch sensor 112. Generally, the higher the rate of sampling, the higher the power usage of touch sensor 112. In these and other embodiments, touch management engine 106 may also receive information regarding a program displaying data to or receiving data from user interface 110 and analyze such information to determine a power mode for touch sensor 112. As an example, such information may be information from an operating system or application program executing on processor 103, the information indicative of areas of touch sensor 112 in which the operating system or application program would expect to receive touch input and/or durations of time in which touch input is expected at touch sensor 112. Accordingly, the power mode may be set to a power mode with a higher touch sensor 112 sampling rate when touch input is expected, and set to a lower sampling rate when touch input is not expected. In addition, in some instances a power mode may exist in which certain areas of touch sensor 112 (e.g., those areas in which touch input is expected) may be set to a higher sampling rate while those areas not expected to receive touch input may be set to a lower sampling rate.

FIG. 2 illustrates a state diagram chart depicting an example method 200 for implementing a multi-mode, multi-sensor approach for managing a touch sensor, in accordance with certain embodiments of the present disclosure. Method 200 may be executed by touch management engine 106 and/or any other component of information handling system 102. In the embodiments represented by FIG. 2, method 200 may have four power states or modes. However, other embodiments may include more or fewer modes. In the embodiment represented by FIG. 2, method 200 includes four modes, an ON mode 202, a WARM mode 204, a SLEEP mode 206, and an OFF mode 208. In ON mode 202, touch management engine 106 may cause touch sensor 112 to sample for touches at its maximum rate of sampling. In WARM mode 204, touch management engine 106 may cause touch sensor 112 to sample for touches at a rate less than that of ON mode 202 (e.g., at 20 percent of the maximum sampling rate). In SLEEP mode 206, touch management engine 106 may cause touch sensor 112 to sample for touches at a rate less than that of WARM mode 204 (e.g., at two percent of the maximum sampling rate). In OFF mode 208, touch management engine 106 may cause touch sensor 112 to be disabled and not sample any touches.

Once operating in a particular mode, touch management engine 106 may transition to another mode in response to information communicated from touch sensor controller 114 (e.g., indicative of touches on touch sensor 112) and/or in response to information communicated from one or more sensors 122 (e.g., indicative of proximity of a human finger or a stylus to touch sensor 112). For example, from WARM mode 204, SLEEP mode 206, and/or OFF mode 208, touch management engine 106 may transition to ON mode 202 in response to one or more sensors 122 communicating a signal indicating proximity of a human finger or a stylus to touch sensor 112, such that by the time the finger or stylus makes contact with touch sensor 112, touch sensor 112 is then sampling at its maximum rate. As another example, from ON mode 202, touch management engine 106 may transition to WARM mode 204 if no touches have been made to touch sensor 112 during a particular period of time and/or one or more sensors 112 have not detected proximity of a finger or stylus during such period of time. As additional time passes without touches to touch sensor 112 and/or detection by one or more other sensors 122 of a finger or stylus proximate to touch sensor 112, touch management engine 106 may transition to SLEEP mode 206, then possibly to OFF mode 208.

In addition to transitioning between modes based on information from touch sensor 112 and one or more other sensors 122, touch management engine 106 may also transition between modes based on information associated with a program (e.g., operating system or application program) executing on processor 103. For example, if a video application is playing a movie, a user may be likely to watch the movie without interacting with user interface 110. Accordingly, based on information from the video application that user interaction is less likely, touch management engine 106 may transition from ON mode 202 to WARM mode 204.

Moreover, in some embodiments, touch management engine 106 may cause different areas of touch sensor 112 to operate in different power modes. For example, turning to the example of a movie playing in a video application, certain portions of the display at user interface 110 may correspond to controls, such as playback controls and/or volume controls for the movie. In such a scenario, touch management engine 106 may cause one or more areas of touch sensor 112 associated with the movie controls to operate in ON mode 202 or a similar mode, while causing other areas of touch sensor to operate in a lower-sampling mode.

Further, touch management engine 106 may also transition between modes based on information communicated from LCD controller 120 and/or backlight controller 118. For example, if LCD controller 120 has entered a power self-refresh mode, touch interaction with touch sensor 112 may be unlikely, and thus, touch management engine 106 may transition from ON mode 202 to WARM mode 204.

Although FIG. 2 discloses a particular number of steps to be taken and operating modes with respect to method 200, method 200 may be executed with greater or lesser steps or modes than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

Although the present disclosure has been described in detail, it should be understood that various changes, substitutions, and alterations can be made hereto without departing from the spirit and the scope of the disclosure as defined by the appended claims.

What is claimed is:

1. An information handling system comprising:
   a processor;
   a user interface comprising:
     a display;
     a display controller configured to control operation of the display;
     a touch sensor overlaid on the display and configured to detect tactile touches on the user interface; and
     a touch sensor controller communicatively interfaced between the touch sensor and the processor and configured to:
       translate signals received from the touch sensor and communicate such translated signals to the processor; and
       control a rate of sampling of tactile touches on the touch sensor; and
   a proximity sensor physically separate from the touch sensor and communicatively coupled to the processor and configured to detect a human finger or stylus proximate to the touch sensor;
   wherein the processor is configured to:
     based on information communicated to the processor from the touch sensor, the proximity sensor, and the display controller, determine a power mode for the touch sensor, the power mode comprising one of a warm mode and a sleep mode in which the touch sensor consumes less power than when in the warm mode;
     wherein the warm mode may occur when the display controller has entered a power self-refresh mode;
     based on the power mode, determine a desired rate of sampling which is different for each power mode; and
     cause the touch sensor controller to control the rate of sampling such that the touch sensor operates at the desired rate of sampling.

2. The information handling system of claim 1, the processor further configured to, based on information regarding a program displaying graphical information to the display:
   determine a first rate of sampling for a first portion of the touch sensor;
   determine a second rate of sampling for a second portion of the touch sensor, the second rate of sampling different than the first rate of sampling; and
   cause the touch sensor controller to control the rate of sampling such that the first portion of the touch sensor operates at the first rate of sampling and the second portion of the touch sensor operates at the second rate of sampling.

3. The information handling system of claim 1, wherein the proximity sensor comprises a near-field sensor configured to detect the presence of electromagnetic radiation proximate to the touch sensor.

4. The information handling system of claim 1, wherein the proximity sensor comprises an antenna configured to detect the presence of electromagnetic radiation proximate to the touch sensor.

5. The information handling system of claim 1, wherein the desired rate of sampling is a non-zero rate of sampling.

6. The information handling system of claim 1,
   wherein the warm mode corresponds to a first rate of sampling;
   wherein the sleep mode corresponds to a second rate of sampling; and
   wherein the second rate is lower than the first rate.

7. The information handling system of claim 6, the processor further configured to:
   while operating in the sleep mode, and while the touch sensor is operating at the second rate of sampling, select the warm mode in response to determining that the proximity sensor indicates a human finger or stylus is proximate to the touch sensor; and
   cause the touch sensor controller to control the rate of sampling such that the touch sensor operates at the first rate of sampling in response to selection of the warm mode.

8. A method comprising:
   receiving information communicated from a touch sensor controller configured to translate signals received from a touch sensor and control a rate of sampling of tactile touches on the touch sensor;
   receiving information communicated from a display controller configured to control operation of a display associated with the touch sensor;
   receiving information communicated from a proximity sensor physically separate from the touch sensor and configured to detect a human finger or stylus proximate to the touch sensor;
   based on the information communicated to a processor from the touch sensor controller, the proximity sensor, and the display controller, determining a power mode for the touch sensor, the power mode comprising one of a warm mode and a sleep mode in which the touch sensor consumes less power than when in the warm mode;
   wherein the warm mode may occur when the display controller has entered a power self-refresh mode;
   based on the power mode, determining a desired rate of sampling which is different for each power mode; and
   causing the touch sensor controller to control the rate of sampling such that the touch sensor operates at the desired rate of sampling.

9. The method of claim 8, further comprising, based on information regarding a program displaying graphical information to the display associated with the touch sensor:
   determining a first rate of sampling for a first portion of the touch sensor;
   determining a second rate of sampling for a second portion of the touch sensor, the second rate of sampling different than the first rate of sampling; and
   causing the touch sensor controller to control the rate of sampling such that the first portion of the touch sensor operates at the first rate of sampling and the second portion of the touch sensor operates at the second rate of sampling.

10. The method of claim 8, wherein the proximity sensor comprises a near-field sensor configured to detect the presence of electromagnetic radiation proximate to the touch sensor.

11. The method of claim 8, wherein the proximity sensor comprises an antenna configured to detect the presence of electromagnetic radiation proximate to the touch sensor.

12. The method of claim 8, wherein the desired rate of sampling is a non-zero rate of sampling.

13. The method of claim 8,
wherein the warm mode corresponds to a first rate of sampling;
wherein the sleep mode corresponds to a second rate of sampling; and
wherein the second rate is lower than the first rate.

14. The method of claim 13, further comprising:
while operating in the sleep mode, and while the touch sensor is operating at the second rate of sampling, selecting the warm mode in response to determining that the proximity sensor indicates a human finger or stylus is proximate to the touch sensor; and
causing the touch sensor controller to control the rate of sampling such that the touch sensor operates at the first rate of sampling in response to selection of the warm mode.

15. An article of manufacture comprising:
a computer readable medium; and
computer-executable instructions carried on the computer readable medium, the instructions readable by a processor, the instructions, when read and executed, for causing the processor to:
receive information communicated from a display controller configured to control operation of a display associated with the touch sensor;
receive information communicated from a touch sensor controller configured to translate signals received from the touch sensor and control a rate of sampling of tactile touches on the touch sensor;
receive information communicated from a proximity sensor physically separate from the touch sensor and configured to detect a human finger or stylus proximate to the touch sensor;
based on the information communicated from the touch sensor controller, the proximity sensor, and the display controller, determine a power mode for the touch sensor, the power mode comprising one of a warm mode and a sleep mode in which the touch sensor consumes less power than when in the warm mode;
wherein the warm mode may occur when the display controller has entered a power self-refresh mode;
based on the power mode, determine a desired rate of sampling which is different for each power mode; and
cause the touch sensor controller to control the rate of sampling such that the touch sensor operates at the desired rate of sampling.

16. The article of claim 15, the instructions for further causing the processor to, based on information regarding a program displaying graphical information to the display associated with the touch sensor:
determine a first rate of sampling for a first portion of the touch sensor;
determine a second rate of sampling for a second portion of the touch sensor, the second rate of sampling different than the first rate of sampling; and
cause the touch sensor controller to control the rate of sampling such that the first portion of the touch sensor operates at the first rate of sampling and the second portion of the touch sensor operates at the second rate of sampling.

17. The article of claim 15, wherein the proximity sensor comprises a near-field sensor configured to detect the presence of electromagnetic radiation proximate to the touch sensor.

18. The article of claim 15, wherein the proximity sensor comprises an antenna configured to detect the presence of electromagnetic radiation proximate to the touch sensor.

19. The article of manufacture of claim 15, wherein the desired rate of sampling is a non-zero rate of sampling.

20. The article of claim 15,
wherein the warm mode corresponds to a first rate of sampling;
wherein the sleep mode corresponds to a second rate of sampling; and
wherein the second rate is lower than the first rate.

21. The article of claim 20, the instructions for further causing the processor to:
while operating in the sleep mode, and while the touch sensor is operating at the second rate of sampling, select the warm mode in response to determining that the proximity sensor indicates a human finger or stylus is proximate to the touch sensor; and
cause the touch sensor controller to control the rate of sampling such that the touch sensor operates at the first rate of sampling in response to selection of the warm mode.

* * * * *